United States Patent
Abraham et al.

(10) Patent No.: US 8,467,345 B2
(45) Date of Patent: Jun. 18, 2013

(54) METHODS AND APPARATUS FOR SCHEDULING WIRELESS TRANSMISSIONS

(75) Inventors: Santosh P. Abraham, San Diego, CA (US); Alok Aggarwal, Foster City, CA (US); Vinay Sridhara, Santa Clara, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 12/543,662

(22) Filed: Aug. 19, 2009

(65) Prior Publication Data

US 2010/0046457 A1    Feb. 25, 2010

Related U.S. Application Data

(60) Provisional application No. 61/090,520, filed on Aug. 20, 2008.

(51) Int. Cl.
*H04W 72/12* (2009.01)
*H04W 72/04* (2009.01)

(52) U.S. Cl.
USPC ........ 370/330; 370/328; 370/252; 455/452.2; 455/423

(58) Field of Classification Search
USPC ....... 370/252, 312, 328, 329, 330; 455/422.1, 455/423, 450, 451, 452.1, 452.2; 375/260
See application file for complete search history.

(56) References Cited

U.S. PATENT DOCUMENTS

| | | | | |
|---|---|---|---|---|
| 7,352,718 | B1* | 4/2008 | Perahia et al. | 370/329 |
| 8,238,837 | B2* | 8/2012 | Womack et al. | 455/68 |
| 2005/0136910 | A1* | 6/2005 | Li et al. | 455/423 |
| 2005/0141624 | A1* | 6/2005 | Lakshmipathi et al. | 375/260 |
| 2005/0147023 | A1* | 7/2005 | Stephens et al. | 370/203 |
| 2006/0056532 | A1* | 3/2006 | Li et al. | 375/267 |
| 2006/0164969 | A1* | 7/2006 | Malik et al. | 370/203 |
| 2007/0270154 | A1* | 11/2007 | Kim et al. | 455/450 |
| 2008/0019307 | A1* | 1/2008 | Tenny et al. | 370/329 |
| 2008/0232287 | A1* | 9/2008 | Shao et al. | 370/311 |
| 2008/0268785 | A1* | 10/2008 | McCoy et al. | 455/67.11 |
| 2009/0023467 | A1* | 1/2009 | Huang et al. | 455/522 |
| 2009/0029714 | A1* | 1/2009 | Rudrapatna | 455/452.2 |
| 2009/0046793 | A1* | 2/2009 | Love et al. | 375/260 |
| 2009/0080504 | A1* | 3/2009 | Li et al. | 375/220 |
| 2009/0252110 | A1* | 10/2009 | Sridhara et al. | 370/330 |
| 2009/0252145 | A1* | 10/2009 | Meylan et al. | 370/348 |

FOREIGN PATENT DOCUMENTS

| | | |
|---|---|---|
| CN | 1826762 A | 8/2006 |
| CN | 1902836 A | 1/2007 |
| EP | 1641180 A1 | 3/2006 |
| WO | WO2008002972 | 1/2008 |

OTHER PUBLICATIONS

International Search Report and Written Opinion—PCT/US2009/054497—ISA/EPO—Nov. 13, 2009.
Taiwan Search Report—TW098128080—TIPO—Aug. 20, 2012.

* cited by examiner

*Primary Examiner* — Chi Pham
*Assistant Examiner* — Ahmed Elallam
(74) *Attorney, Agent, or Firm* — Kevin Cheatham

(57) ABSTRACT

Certain embodiments provide a method for scheduling packet transmissions in a wireless communications with stations that support spatial division multiple access (SDMA) transmissions. The method generally includes receiving channel state training signals from a plurality of wireless network nodes, constructing a schedule for uplink and downlink packet transmissions for the nodes based on the channel state training signals, and communicating the schedule to the nodes.

40 Claims, 14 Drawing Sheets

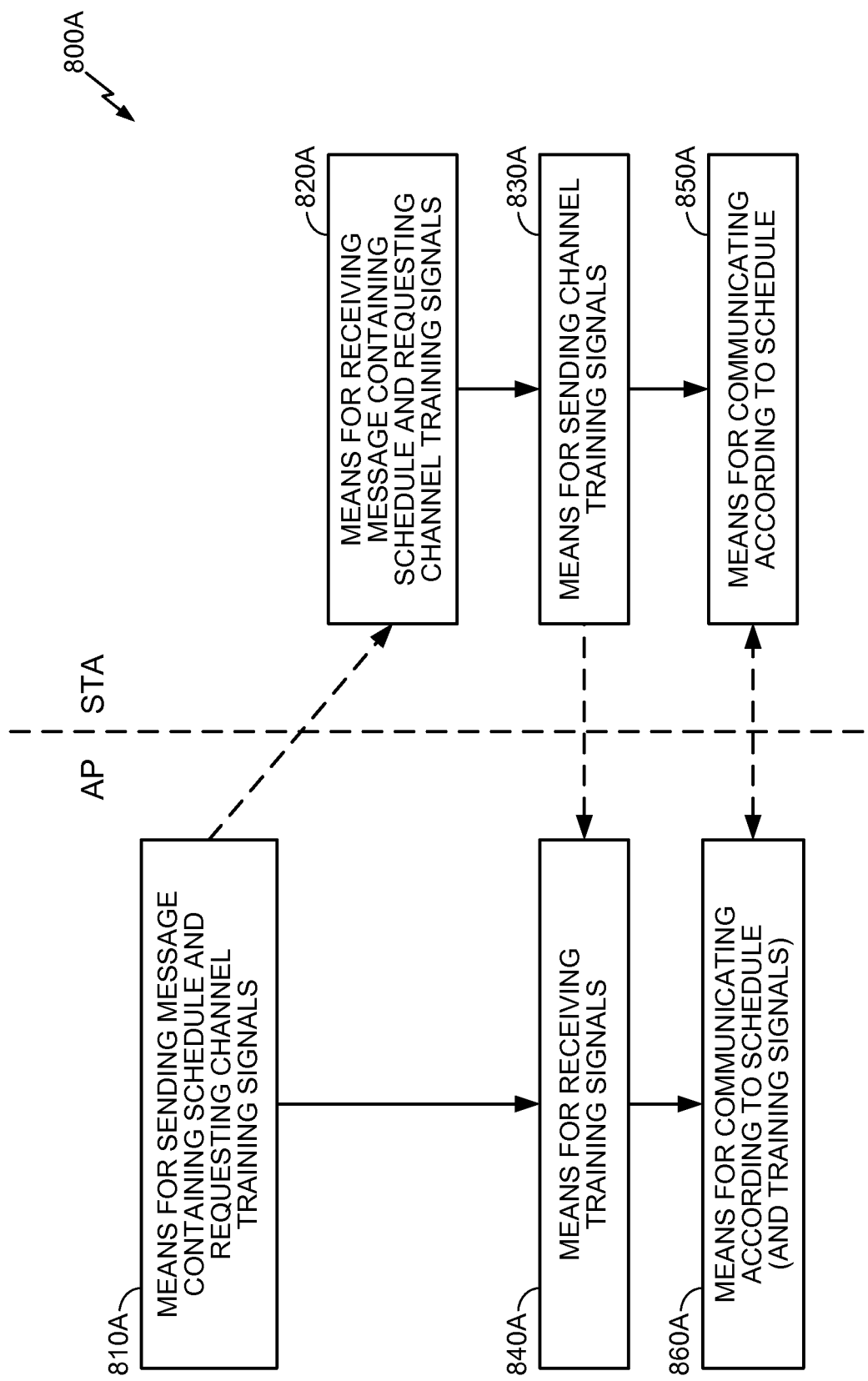

METHODS AND APPARATUS FOR SCHEDULING WIRELESS TRANSMISSIONS

CROSS-REFERENCE TO RELATED APPLICATION

This application claims benefit of U.S. Provisional Patent Application Ser. No. 61/090,520 filed Aug. 20, 2008, which is herein incorporated by reference in its entirety.

BACKGROUND

In order to address the issue of increasing bandwidth requirements that are demanded for wireless communications systems, different schemes are being developed to allow multiple user terminals to communicate with a single base station by sharing the same channel (e.g., the same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of a plurality of space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of the antennas separated in space, and the combined received signals from multiple antennas may be split into independent signals transmitted from each user terminal by applying the appropriate signal processing technique.

A multiple-input multiple-output (MIMO) wireless system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (e.g., either the access point or the user terminal), and the $N_R$ receive antennas are associated with one receiving entity (e.g., either the user terminal or the access point). The access point can also communicate with multiple user terminals simultaneously via SDMA. For SDMA, the access point utilizes multiple antennas for data transmission and reception, and each of the user terminals typically utilizes one antenna for data transmission and multiple antennas for data reception.

SUMMARY

Certain embodiments provide a method for scheduling packet transmissions in a wireless communications. The method generally includes receiving channel state training signals from a plurality of wireless network nodes and constructing a schedule for uplink and downlink packet transmissions for the nodes based on the channel state training signals.

Certain embodiments provide a method for scheduling packet transmissions in a wireless communications. The method generally includes sending a message to a plurality of wireless network nodes, the message containing a schedule for wireless transmissions to and from the nodes and receiving channel state training signals from a plurality of the wireless network nodes in response to the message.

Certain embodiments provide a method for scheduling packet transmissions in a wireless communications. The method generally includes receiving a message requesting transmission of a channel state signal and containing a schedule for wireless transmissions to and from a plurality of nodes in a wireless communications network sending a channel state training signal in response to the message and exchanging packets with the network according to the schedule.

Certain embodiments provide an apparatus for scheduling packet transmissions in a wireless communications. The apparatus generally includes logic for receiving channel state training signals from a plurality of wireless network nodes and logic for constructing a schedule for uplink and downlink packet transmissions for the nodes based on the channel state training signals.

Certain embodiments provide an apparatus for scheduling packet transmissions in a wireless communications. The apparatus generally includes logic for sending a message to a plurality of wireless network nodes, the message containing a schedule for wireless transmissions to and from the nodes logic for receiving channel state training signals from a plurality of the wireless network nodes in response to the message.

Certain embodiments provide an apparatus for scheduling packet transmissions in a wireless communications. The apparatus generally includes logic for receiving a message requesting transmission of a channel state signal and containing a schedule for wireless transmissions to and from a plurality of nodes in a wireless communications network logic for sending a channel state training signal in response to the message and logic for exchanging packets with the network according to the schedule.

Certain embodiments provide an apparatus for scheduling packet transmissions in a wireless communications. The apparatus generally includes means for receiving channel state training signals from a plurality of wireless network nodes and means for constructing a schedule for uplink and downlink packet transmissions for the nodes based on the channel state training signals.

Certain embodiments provide an apparatus for scheduling packet transmissions in a wireless communications. The apparatus generally includes means for sending a message to a plurality of wireless network nodes, the message containing a schedule for wireless transmissions to and from the nodes and means for receiving channel state training signals from a plurality of the wireless network nodes in response to the message.

Certain embodiments provide an apparatus for scheduling packet transmissions in a wireless communications. The apparatus generally includes means for receiving a message requesting transmission of a channel state signal and containing a schedule for wireless transmissions to and from a plurality of nodes in a wireless communications network means for sending a channel state training signal in response to the message and means for exchanging packets with the network according to the schedule.

Certain embodiments provide a computer-program product for scheduling packet transmissions in a wireless communications comprising a computer readable medium having instructions stored thereon, the instructions being executable by one or more processors. The instructions generally include instructions for receiving channel state training signals from a plurality of wireless network nodes and constructing a schedule for uplink and downlink packet transmissions for the nodes based on the channel state training signals.

Certain embodiments provide a computer-program product for scheduling packet transmissions in a wireless communications comprising a computer readable medium having instructions stored thereon, the instructions being executable by one or more processors. The instructions generally include instructions for sending a message to a plurality of wireless network nodes, the message containing a schedule for wireless transmissions to and from the nodes and receiving channel state training signals from a plurality of the wireless network nodes in response to the message.

Certain embodiments provide a computer-program product for scheduling packet transmissions in a wireless communications comprising a computer readable medium having instructions stored thereon, the instructions being executable by one or more processors. The instructions generally include instructions for receiving a message requesting transmission of a channel state signal and containing a schedule for wireless transmissions to and from a plurality of nodes in a wireless communications network, sending a channel state training signal in response to the message, and instructions for exchanging packets with the network according to the schedule.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 8A illustrates example components capable of performing the operations shown in FIG. 8.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Figure 1:
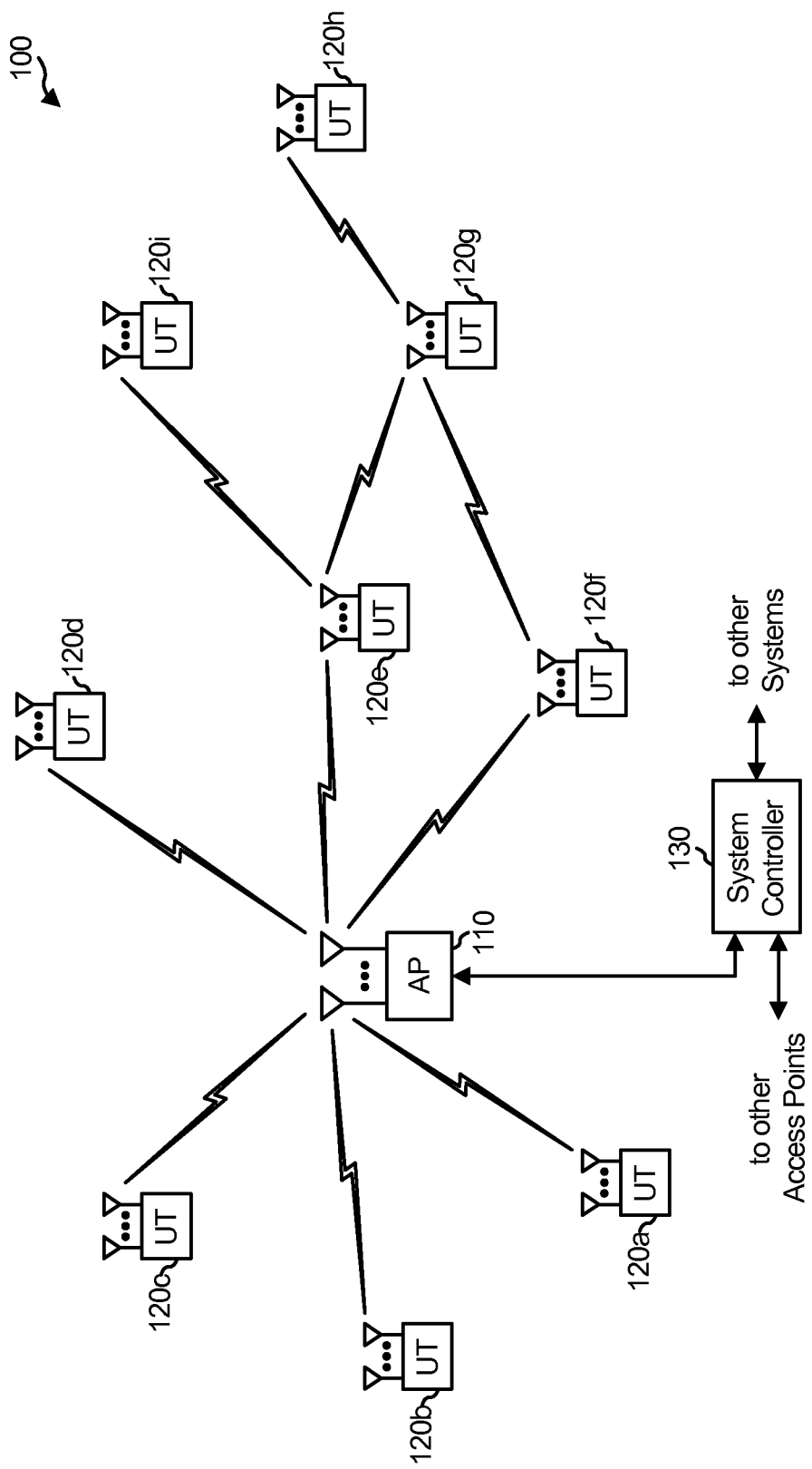
FIG. 1 shows a spatial division multiple access MIMO wireless system in accordance with certain embodiments of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

The AP 110 and user terminals 120 may be part of a wireless local area network (WLAN). For certain embodiments, the nodes may communicate via an SDMA scheme using orthogonal frequency division multiple access (OFDMA) techniques.

While portions of the following disclosure will describe user terminals 120 capable of communicating via SDMA, for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
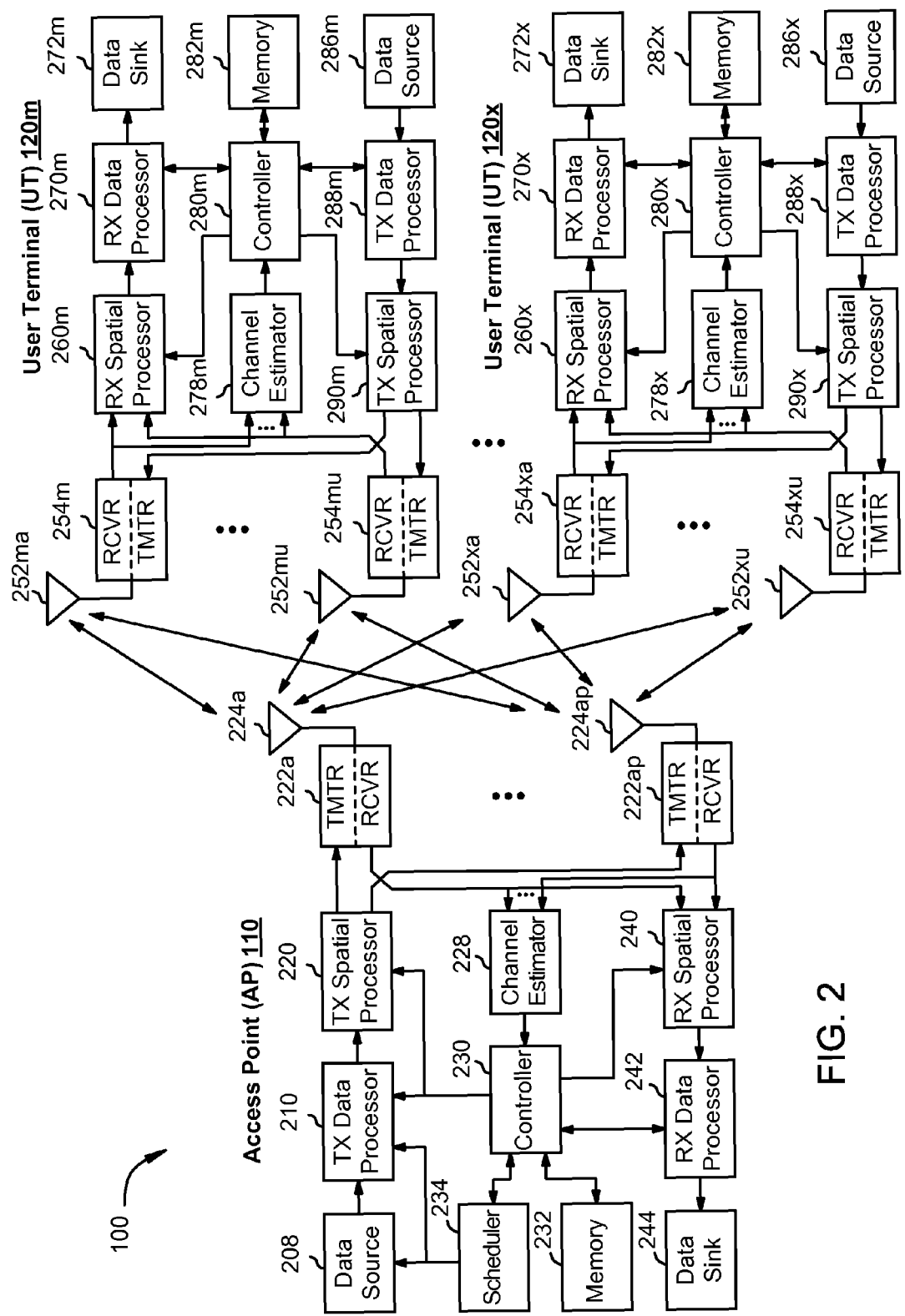
FIG. 2 shows a block diagram of an access point and two user terminals in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{S_{dn,m}\}$ for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink steering vectors, SNR estimates, and so on) to the access point. Controllers 230 and 280 also control the operation of various processing units at access point 110 and user terminal 120, respectively.

Figure 3:
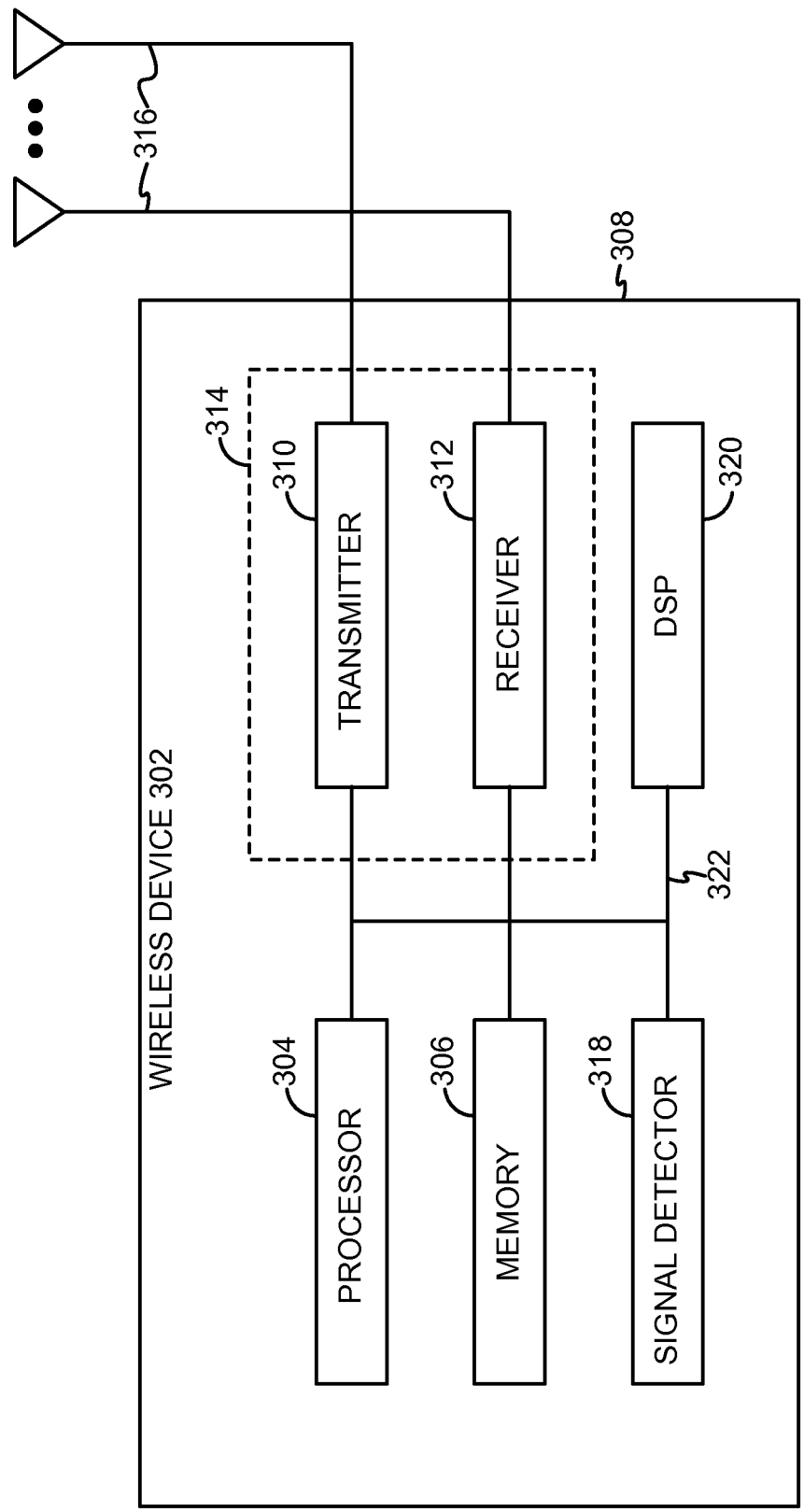
FIG. 3 illustrates example components of a wireless device in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120. As used herein, the terms wireless device and wireless node may be used interchangeably and may refer to either an access point (AP) or station (STA).

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Extended PSMP Mechanism for SDMA

Certain embodiments of the present disclosure utilize Power Save Multi-Poll (PSMP) messages to schedule uplink and downlink transmissions to multiple nodes in a wireless LAN. In one embodiment, a protocol enables Spatial-Division Medium Access (SDMA) capable stations to participate in a PSMP transaction. A PSMP message generally refers to a multicast message that identifies a set of stations (e.g., in a MAC header) and may contain scheduling information, such as downlink transmission times (DTTs) and uplink transmission times (UTTs) for the set of stations. According to certain aspects, an existing format of a PSMP message used to schedule (non-overlapping) transmissions for legacy (non-SDMA) stations may be extended to allow scheduling of (overlapping) simultaneous transmissions from SDMA-capable stations. Utilizing a PSMP message to schedule SDMA transmissions may be advantageous because it allows the efficient scheduling of transmissions for multiple stations with a single multicast message, thereby conserving air resources and power.

Figure 12:
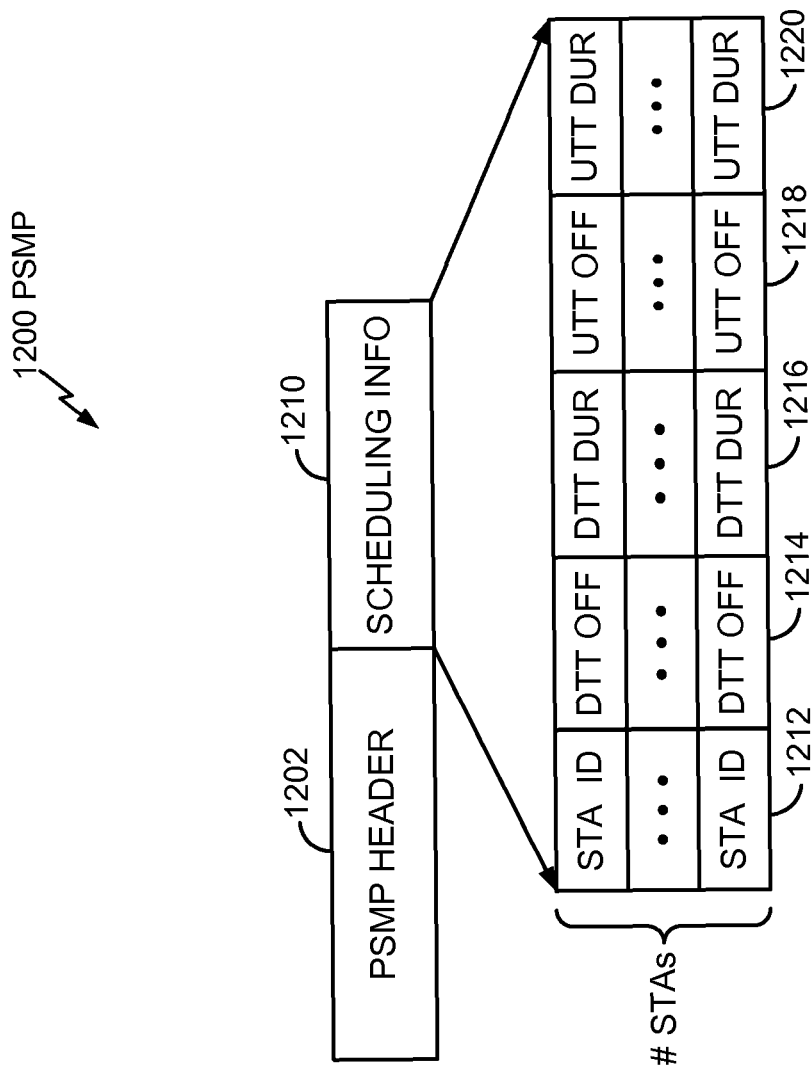
FIG. 12 illustrates an example format of a Power Save Multi-Poll (PSMP) message containing scheduling information, according to one embodiment of the disclosure.

For certain embodiments, the protocol generally includes sending a training request message (RM) to a subset of stations, such as Very High Throughput (VHT) SDMA stations, and retrieving the training pilots from those stations. Once the training has been received, the PSMP schedule message is constructed so that SDMA capable stations may be scheduled to transmit simultaneously, while legacy stations each have their own dedicated transmission periods (or epochs). FIG. 12, described in detail below, illustrates the type of scheduling information that may be constructed and transmitted to (SDMA-capable and legacy) stations in a PSMP message. The protocol presented herein may allow the performance benefit of using SDMA-capable stations while preserving backward compatibility to legacy systems.

For certain embodiments, the protocol may involve a VHT-specific message that functions to incorporate a training request message (RM) and also includes scheduling information for SDMA stations. The VHT-specific message may be designed such that legacy stations simply ignore the message.

An Example Legacy Compatible Approach

Figure 4:
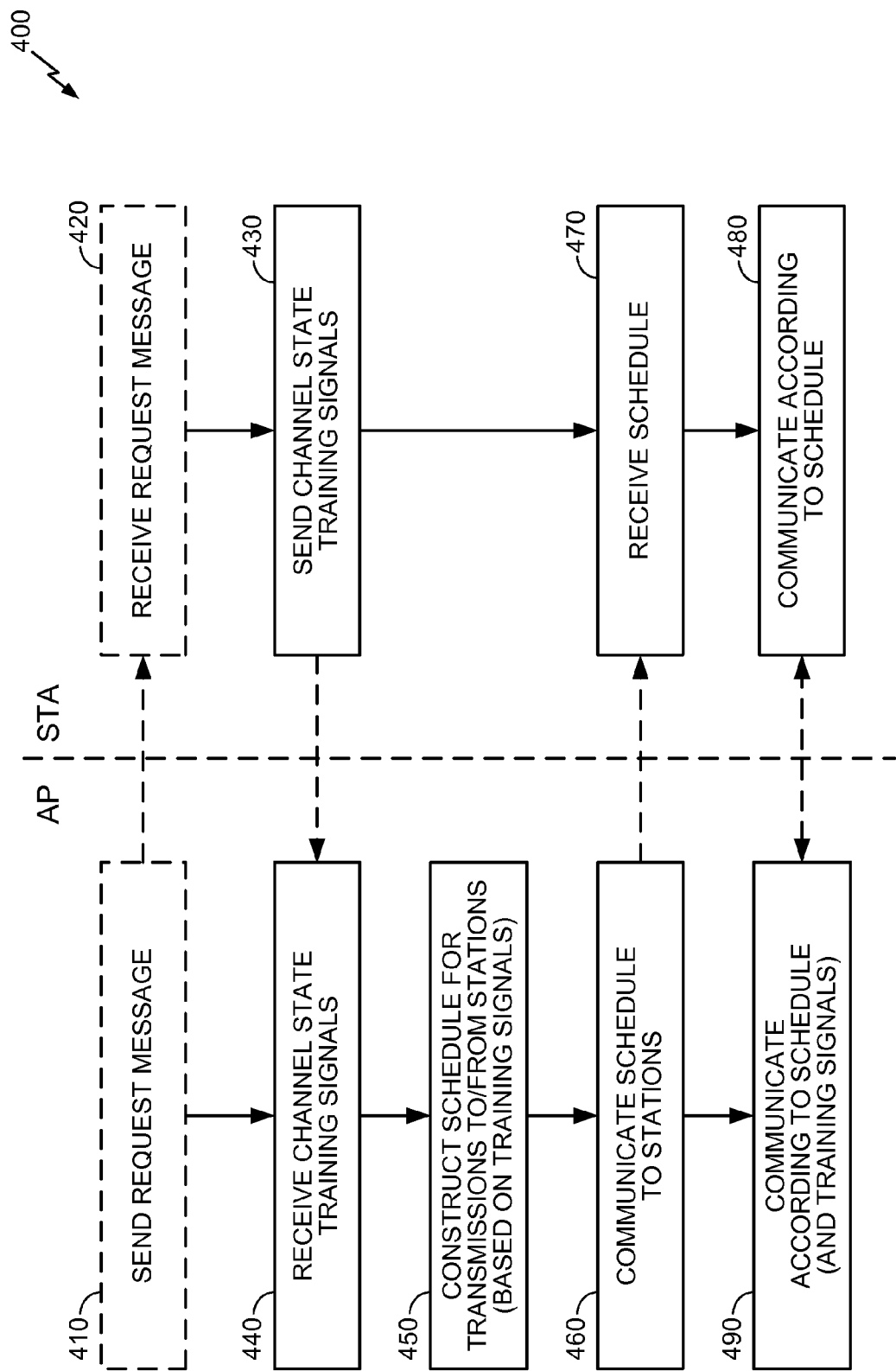
FIG. 4 illustrates example operations for scheduling transmissions in an SDMA system.

FIG. 4 is a flow diagram illustrating example operations for scheduling SDMA transmissions in accordance with certain embodiments of the present disclosure. FIG. 4 illustrates example operations performed at an access point and corresponding operations performed at a station. As illustrated in the timing diagrams of FIGS. 5-7, in an SDMA system, multiple stations may simultaneously perform the operations shown in FIG. 4. As illustrated, according to certain embodiments, a message with a legacy PSMP format may be used to convey scheduling information.

For the sake of illustration, the operations of FIG. 4 are described below in conjunction with example timing diagrams illustrated in FIGS. 5, 6 and 7. The operations begin at 410, when an access point (AP) sends a request message (RM). At 420, the RM is received by stations (STAs).

At 430, each STA sends channel training signals to the AP. The channel (or channel state) training signals may take the form of, for example, sounding signals 504 shown in FIG. 5. At 440, the channel training signals are received by the AP. For certain embodiments, rather than initiate sending channel training signals with a request message, the sending of training signals may be sent according to some other mechanism. Thus, operations 410 and 420 are optional.

At 450, the AP constructs a schedule for transmissions to/from the STAs based on the received channel training signals. For example, the AP may determine, based on the training signals, which stations should be granted upstream resources and, for certain embodiments, some stations may not be granted resources. For example, the AP may deem that one station should not be granted UL resources, for example, if it exhibits high correlation with another station.

At 460, the AP communicates the schedule to the STAs. At 470, the schedule is received by the STAs. At 480, the STAs communicate with the AP according to the schedule. For example, the STAs may receive SDMA data from the AP at DTTs specified in the schedule and send SDMA data to the AP at UTTs specified in the schedule.

At 490, the AP communicates with the STAs according to the schedule. For example, the AP may send SDMA data and receive SDMA data based on DTTs and UTTs specified in the schedule. The AP may also communicate in a manner dictated by the channel training signals. For example, the AP may control SDMA transmissions, based on the training signals, to optimize spatial diversity.

Figure 5:
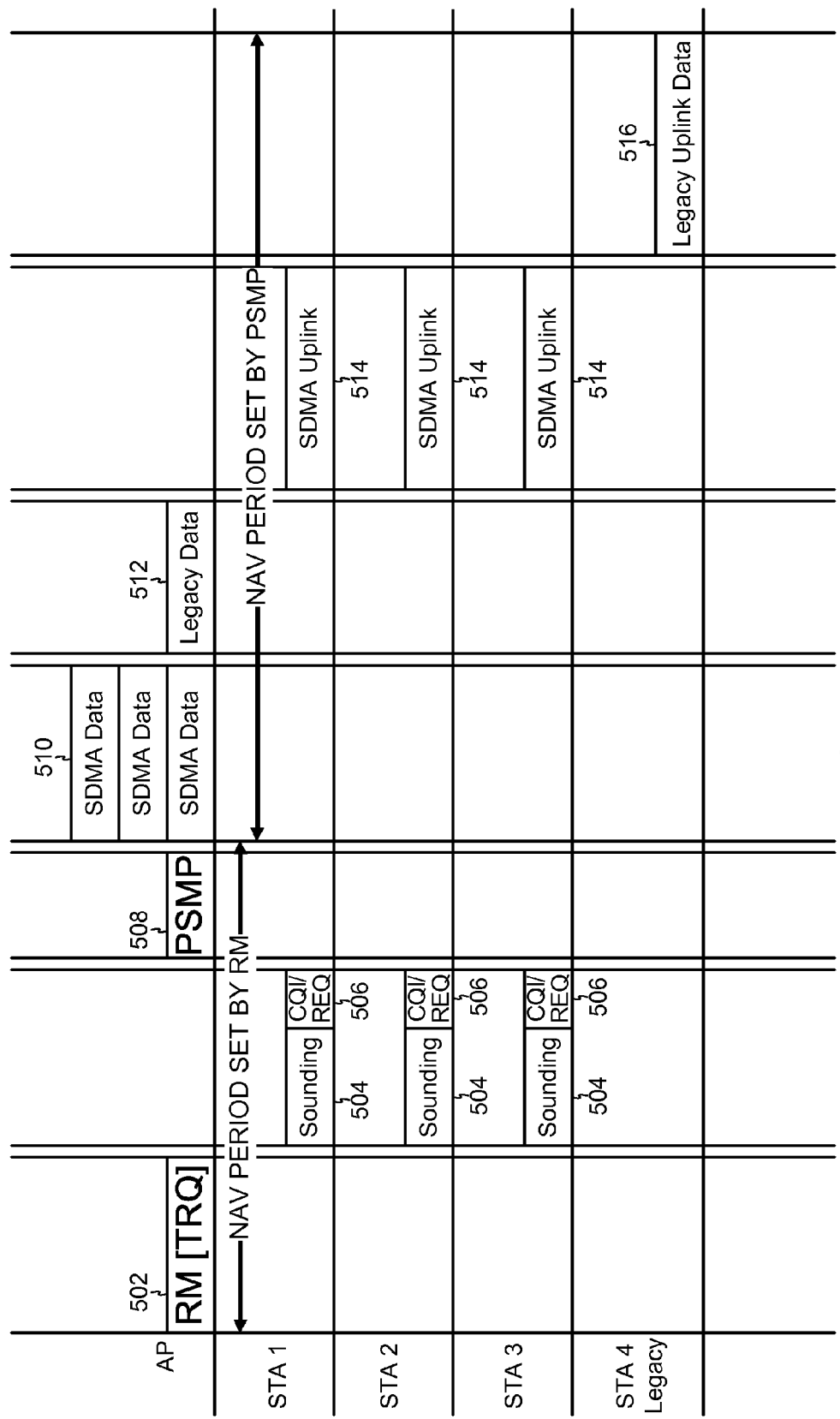
FIGS. 5-7 are example timing diagrams showing example message flows for scheduling transmissions in an SDMA system.

FIG. 5 illustrates a timing diagram for an example exchange in which an AP schedules SDMA transmission for four stations (STA1-STA4). As illustrated, the AP may begin an SDMA PSMP epoch by sending a training request message (RM) 502 to SDMA STAtions 1-3 and to a legacy station 4. In response to the RM 502, each SDMA STA sends channel training signals, illustratively sounding frames 504. For certain embodiments, training signals may include channel quality information-CQI 506.

As illustrated, for certain embodiments, the RM duration field sets the NAV time period sufficiently long to protect the communications channel for the time required for receiving the sounding frames from the SDMA STAs and a PSMP frame sent by the AP. The duration field of the PSMP message covers the time required for subsequent (DL and UL) data transmissions. The AP may send the PSMP frame 508 after receiving the sounding frame 504 from the SDMA STAs.

The PSMP frame 508 may contain scheduling information for SDMA (and/or legacy) stations, such as downlink (DL) and uplink (UL) start offsets and durations for the SDMA STAs and the legacy STA. Thus, the PSMP frame may be followed by SDMA DL data 510 to the stations, and legacy data 512 sent to a legacy station. Subsequently, SDMA stations may send uplink (UL) SDMA data 514, while legacy stations may subsequently send uplink data 516.

These DL and UL transmissions (for both SDMA and legacy stations) may be made at the time specified by the PSMP frame 508. For the SDMA STAs, the number of streams may be bounded by the number of streams that each SDMA STA was asked to train on in the RM message.

The technique presented herein may simply scheduling by combining SDMA and TDM transmissions scheduling for both DL and UL transmissions. It may also improve efficiency by increasing the number of STAs that can be scheduled in a given transmit opportunity (TXOP).

Figure 6:
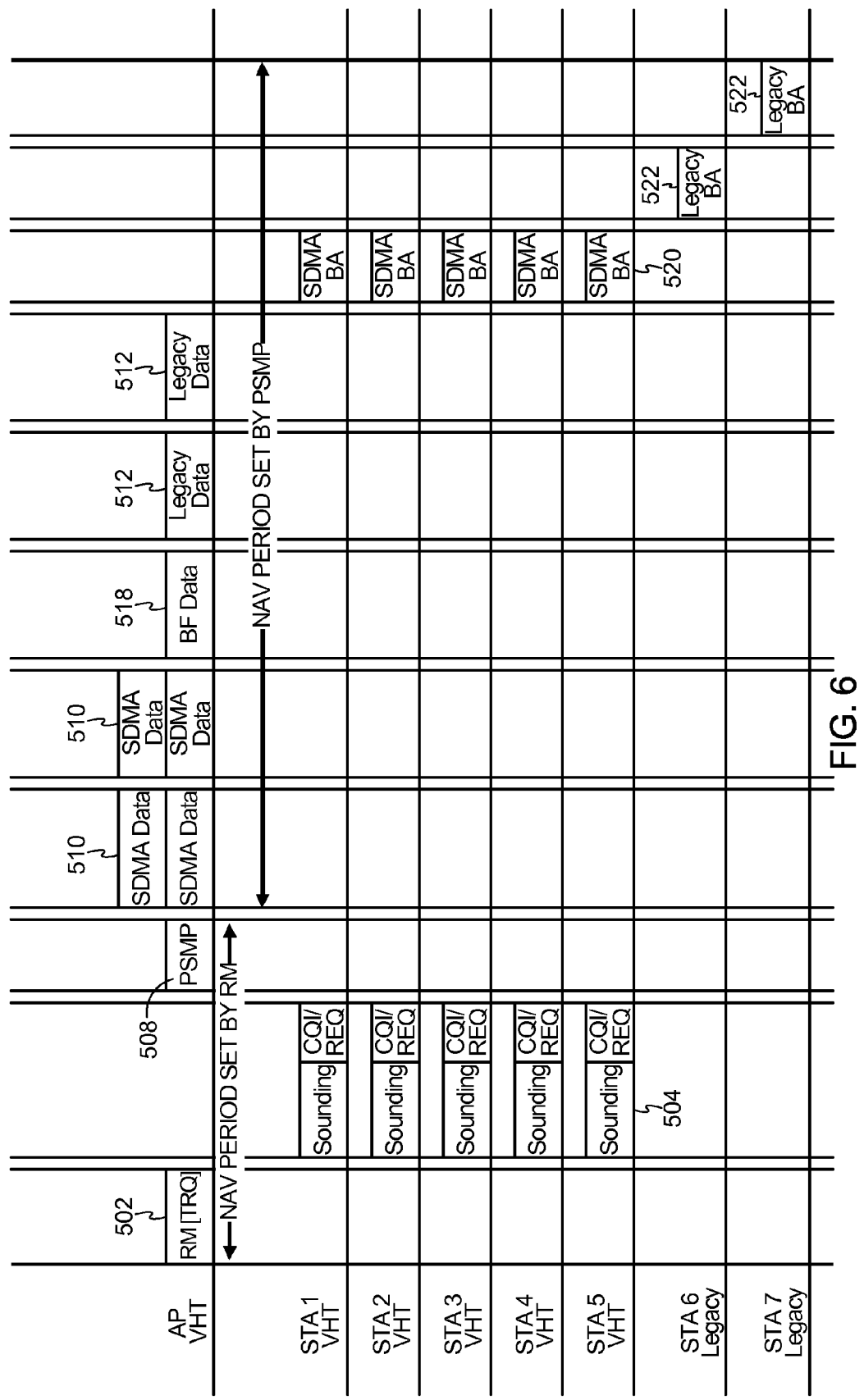

FIG. 6 is a timing diagram of a second example of scheduling transmissions using a PSMP frame 508, according to one embodiment of the disclosure. FIG. 6 illustrates that the AP may schedule different STAs to send DL SDMA data 510 in separate frames/time slots. Note that SDMA Data for a single user (e.g., STA 1) may be considered the same as beam forming (BF) data 518. For certain embodiments, a schedule may indicate transmission to at least one node via some other transmission scheme, such as cyclic delay diversity, multiple input multiple output (MIMO), or Space Time Block Code (STBC).

The PSMP scheduling information may also provide a UL block acknowledge (BA) schedule (specifying different times for TDM UL BAs 522 from different stations). However, SDMA UL BAs 520 may also be sent simultaneously using the same spatial streams as the sounding. For certain embodiments, each STA may be free to choose its own MCS, which may provide an advantage over TDM BA. For certain embodiments, scheduling information may also indicate at least one node transmitting with an omni-directional antenna.

Figure 7:
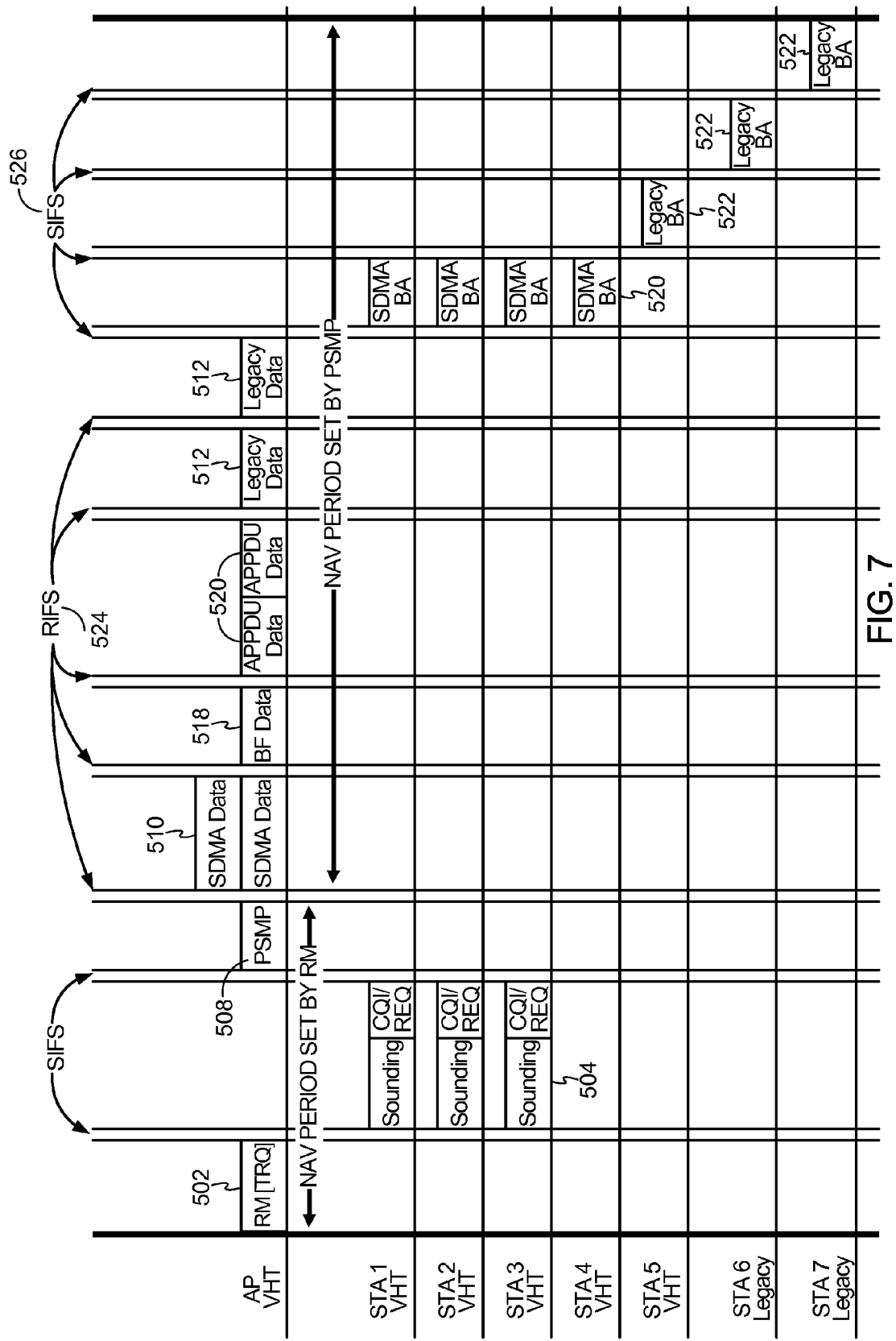

FIG. 7 is a timing diagram of a third example of scheduling transmissions using a legacy PSMP frame 508, according to one embodiment of the disclosure. FIG. 7 illustrates that the AP may communicate with some SDMA-capable STAs (e.g., STAs 4 and 5) using techniques other than SDMA, such as with conventional 802.11 frames (APPDUs 520).

SDMA-Capable Station Specific Approach

Figure 8:
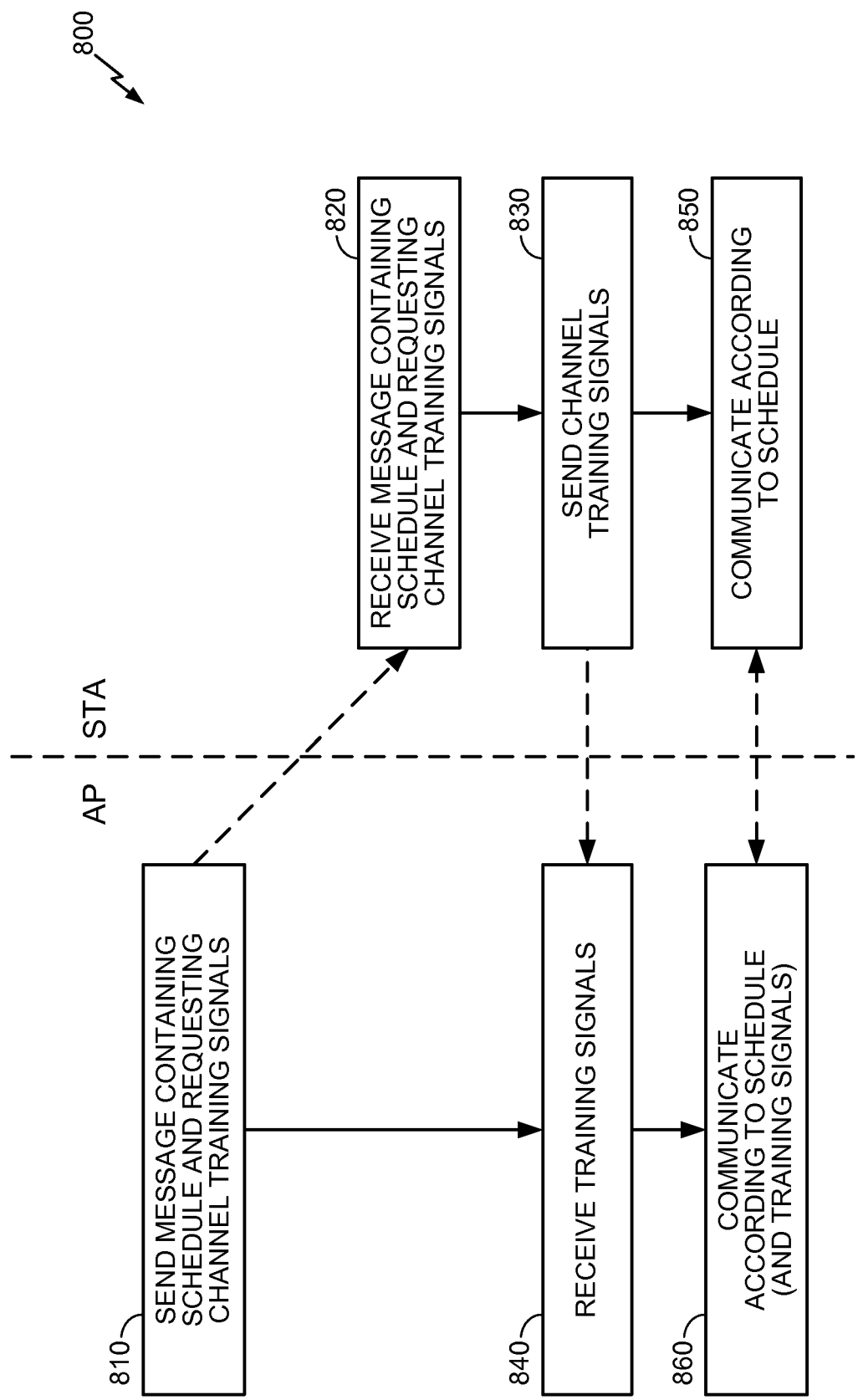
FIG. 8 illustrates example operations for scheduling transmissions in an SDMA system.

FIG. 8 illustrates example operations for scheduling transmissions targeting SDMA-capable stations with an enhanced PSMP message (that may also serve as a request message to request sounding), according to one embodiment of the disclosure. For the sake of illustration, the operations 800 are described below in conjunction with an example timing diagram illustrated in FIG. 9.

The operations begin at 810, where an AP sends a message containing a schedule for SDMA transmission and requesting channel training signals. At 820, the message is received by STAs. At 830, each STA sends channel training signals to the AP. At 840, the channel training signals are received by the AP. At 850, the STAs communicate with the AP according to the schedule.

At 860, the AP communicates with the STAs according to the schedule and the received channel training signals. For example, as previously described, the AP may send SDMA data and receive SDMA data based on DTTs and UTTs specified in the schedule and may control SDMA transmissions, based on the training signals, to optimize spatial diversity.

Figure 9:
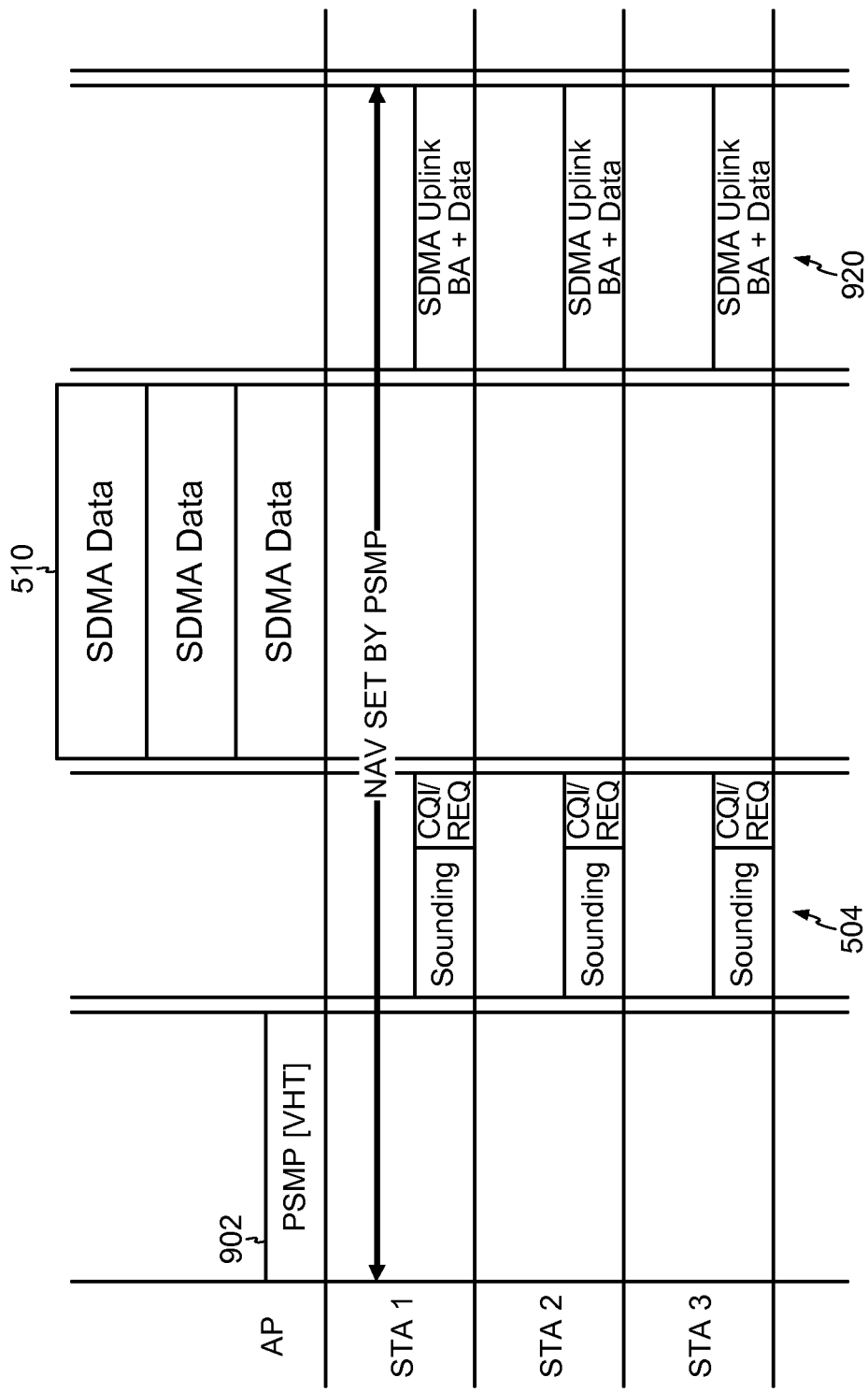
FIG. 9 is an example timing diagram showing example message flow for scheduling transmissions in an SDMA system.

For example, as shown in FIG. 9, an AP may acquire the medium using a point coordination function interframe space (PIFS) or Enhanced Distributed Channel Access (EDCA). The AP then sends a VHT-specific PSMP frame 902 to STAs 1-3. In response, each STA sends channel training signals, illustratively as sounding frames 504.

In one embodiment, the PSMP duration field protects transmissions by setting the network allocation vector (NAV) until the PSMP transaction is complete. The AP sends DL SDMA data 510. The DL transmission may also include MCSFB and SS allocation information. Each STA may also send SDMA uplink data 920, which may include block acknowledgements (BAs) of the SDMA DL data.

Thus, the SDMA-specific PSMP 902 may help conserve resources by functioning as a combination of a RM and a legacy PSMP. Further, the SDMA-specific PSMP 902 may provide UL and DL transmit offsets and duration, and allocates the number of streams that each STA can use for UL data.

In an alternate embodiment, some alternative to a PSMP message may be used. For example, according to certain embodiments, an AP may send a Clear To Send (CTS) message to itself in order to obtain the required NAV protection.

Figure 10:
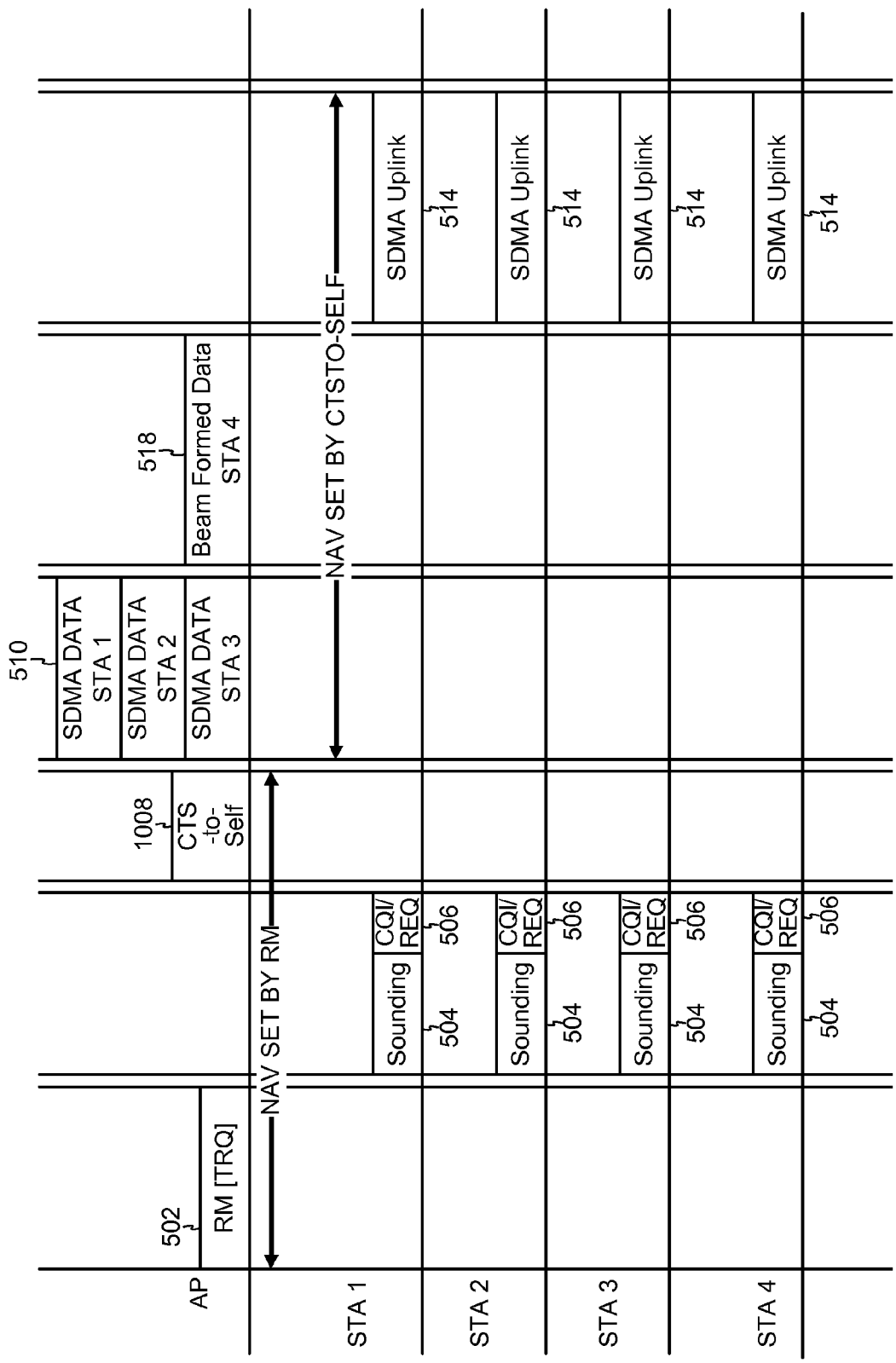
FIG. 10 is an example timing diagram showing example message flows for scheduling transmissions in an SDMA system, according to one embodiment of the disclosure.

As illustrated in FIG. 10, following the CTS message 1008, the AP may send DL SDMA data 510. According to certain embodiments, the AP may split the STAs into groups and communicate to the individual groups using SDMA. If one of the groups consist of a single node, then the AP may also use beam forming to communicate beam formed data 518 to that one STA (as with STA4 in the illustrated example). The schedule for the uplink data transmission 514 may be indicated as part of the downlink data transmission, for example, through an augmented header field of the transmitted packets or via a separate packet itself.

Figure 11:
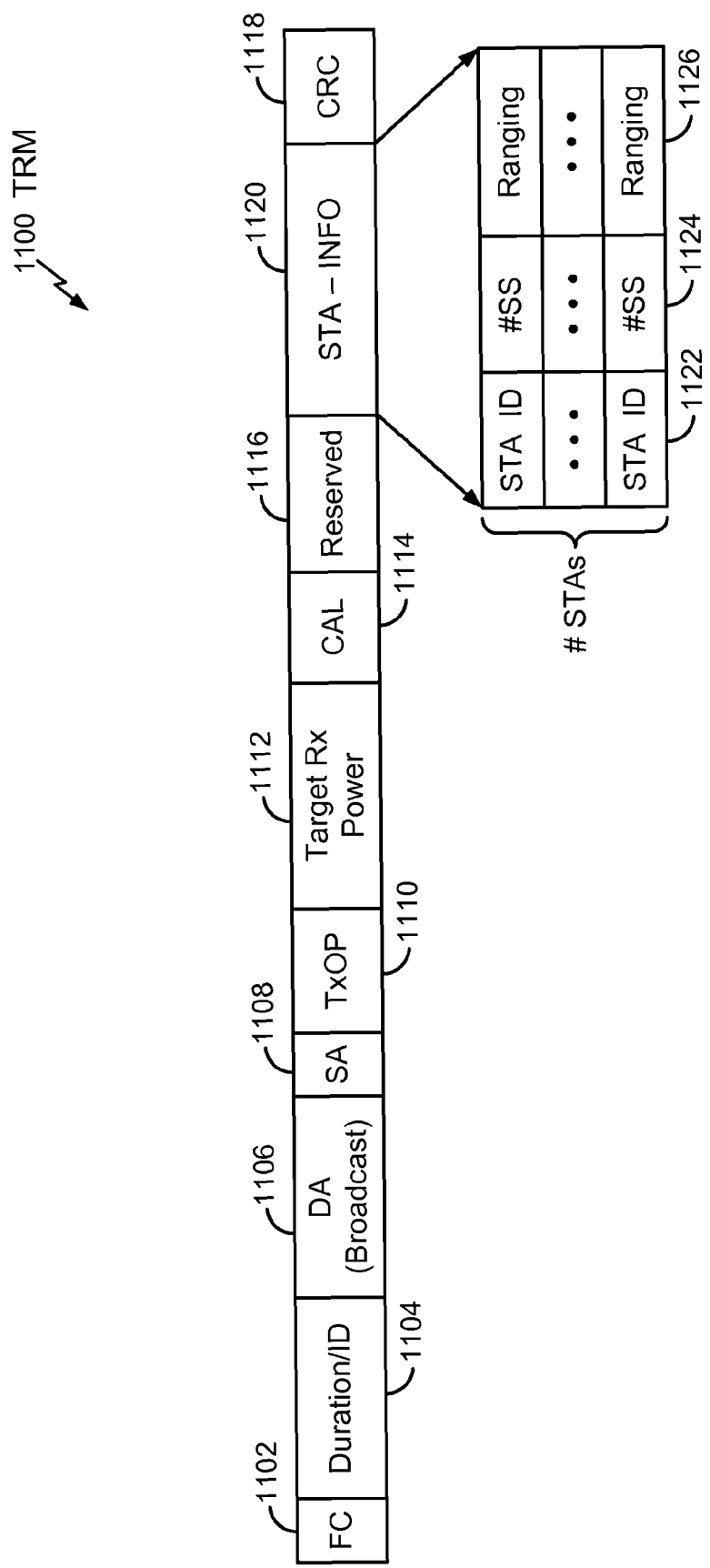
FIG. 11 illustrates an example format of a training request message, according to one embodiment of the disclosure.

FIG. 11 illustrates an example format of a training request message (TRM) 1100 that the AP may use to convey timing adjustment information for certain embodiments of the present disclosure. According to certain embodiments, the TRM 1100 may include a frame control (FC) field 1102. The FC field 1102 may include some number of bits (e.g., 16 bits) with various information, such as a Protocol version, frame type and subtype.

The TRM 1100 may also include a Duration/ID field 1104 indicating how long the related transmission will be used. The Duration/ID field 1104 may include, for example, 16 bits, which may be set to cover subsequent transmissions (e.g., additional training or acknowledgements).

The TRM 1100 may also include a recipient or destination address (DA) 1106 source address (SA) 1108, which may both be 48-bit addresses, for example. The DA 1106 may be set to multicast/broadcast address for a set of stations receiving the information. The SA 1108 may be set to an address of the AP sending the TRM. A transmit opportunity (TXOP) field 1110 may indicate (e.g., with 10 bits) an amount of time allocated for acknowledgement of the TRM 1100. A target receive (Rx) power field 1112 may provide an indication of a reference receive power (e.g., as a 6-bit number). A receiving station may compare the actual receive power of the TRM (as received at the station) to the target Rx power field to obtain an indication of proximity of the station to the AP and may adjust its transmission power accordingly. A calibration (CAL) position field 1114 may have one or more bits set to indicate occurrence/non-occurrence of a calibration procedure. According to some embodiments, a set of reserved bits 1116 (e.g., 7 bits) may be reserved to accommodate future functionality. A CRC field 1118 (e.g., 32-bits) may allow for error correction.

The TRM 1100 may also include a station information field 1120 that may include information for the group of stations. As illustrated, for some embodiments, the station information field 1120 may include information for a number of stations. Because the number of stations may vary, the size of the station information field 1120 may vary. For each station, a station id (STA ID) field 1122, a field 1124 indicating a number of spatial streams (#SS) allocated to a station, and a ranging field 1126. The STA ID field 1122 may include an identification (e.g., a 16-bit ID) of a station, while the #SS field 1124 may indicate a number of spatial streams (e.g., as a 4 bit number) allocated to the identified station, while the ranging field 1126 may specify a number of time increments (e.g., 4 bits) to advance or retard transmission timing so SDMA transmissions from different stations arrive at the AP nearly simultaneously.

For certain embodiments, a TRM message may only require a subset of the illustrated fields as mandatory fields. For example, for certain embodiments, only the FC field 1102, Duration/ID field 1104, DA field 1106, SA field 1108, STA INFO field 1120, and CRC 1118 may be mandatory. Further, for certain embodiments, rather than include ranging information for a plurality of stations in the STA INFO field 1120, while less efficient, separate messages may be sent for each station.

FIG. 12 illustrates the type of scheduling information that, according to certain embodiments, may be constructed and transmitted to (legacy and VHT) stations in a PSMP message 1200. As illustrated, the PSMP message 1200 may have a PSMP header 1202. The PSMP may also include the scheduling information 1210. As illustrated, the scheduling information 1210 may include, for a number of stations, identified by Station IDs 1212. The scheduling information for each station may include a Downlink Transmission Time (DTT) Offset 1214, DTT Duration 1216, Uplink Transmission Time (UTT) Offset 1218, and UTT Duration 1220. For SDMA-capable stations, the transmission times defined by the scheduling information may overlap indicating simultaneous transmissions. According to certain aspects, the scheduling information may also include non-overlapping transmission times for legacy stations.

Figure 4A:
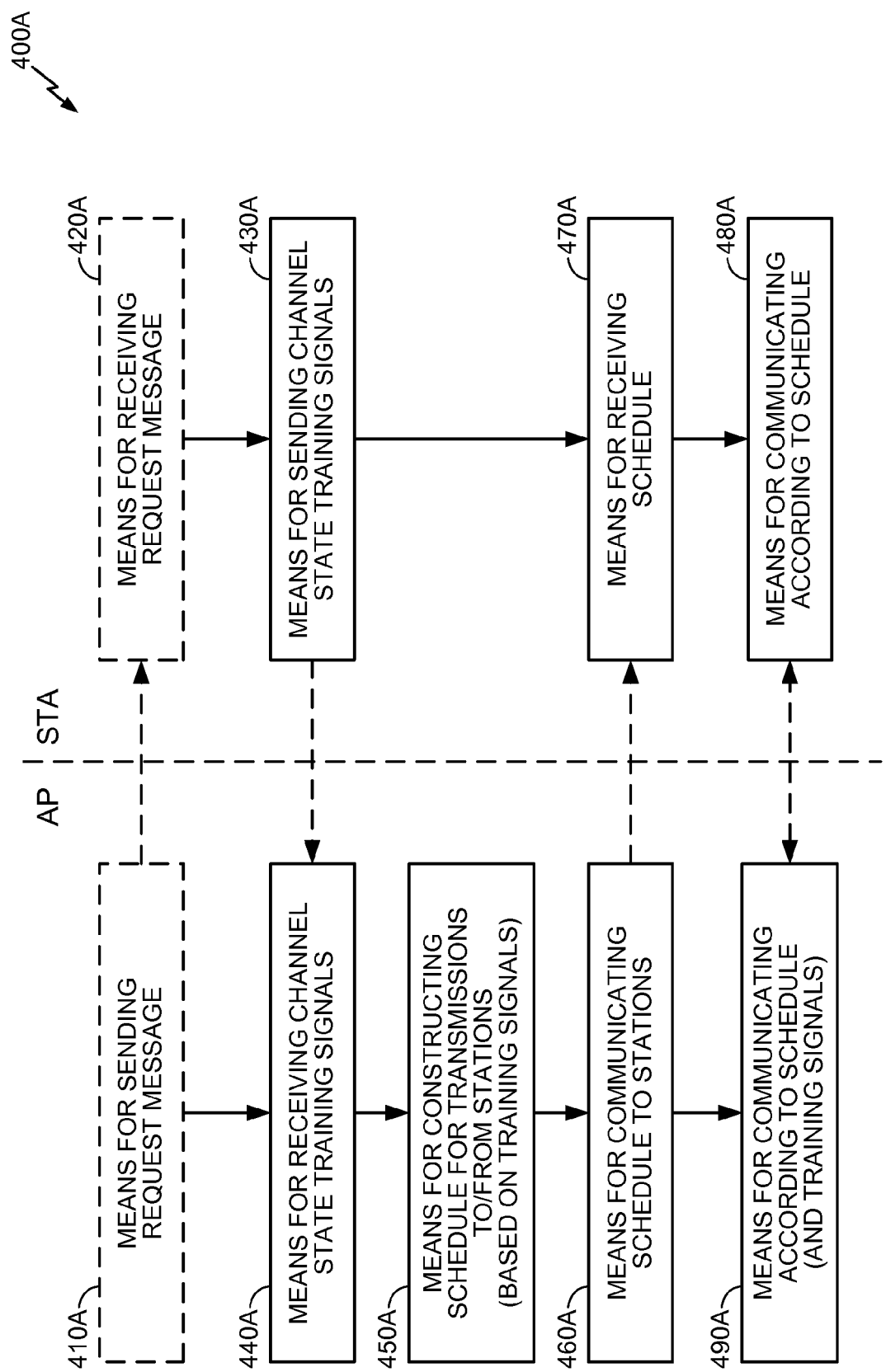
FIG. 4A illustrates example components capable of performing the operations shown in FIG. 4.

The various operations of methods described above may be performed by logic implemented in various hardware and/or software component(s) and/or module(s) corresponding to means-plus-function blocks illustrated in the figures. Generally, where there are methods illustrated in figures any suitable means having corresponding counterpart means-plus-function figures, the operation blocks correspond to means-plus-function blocks with similar numbering. For example, operations 400 and 800 shown in FIGS. 4 and 8, respectively, may be performed by corresponding means 400A and 800A shown in FIGS. 4A and 8A, respectively.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method comprising:
   receiving channel state training signals from a plurality of wireless network nodes;
   generating a schedule of uplink data packet transmissions and downlink data packet transmissions during a particular transmit opportunity (TXOP), wherein the schedule is based on the channel state training signals; and
   sending the schedule to the plurality of wireless network nodes, wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme.

2. The method of claim 1, wherein the channel state training signals are received concurrently from multiple wireless network nodes of the plurality of wireless network nodes.

3. The method of claim 1, wherein the first schedule information indicates the first subset of the plurality of wireless network nodes transmits one or more uplink data packets concurrently using the SDMA scheme, and wherein the first subset of the plurality of wireless network nodes transmits the one or more data packets during a first time period of the particular TXOP.

4. The method of claim 3, wherein the schedule includes third schedule information that indicates data is transmitted to at least one wireless network node of a third subset of the plurality of wireless network nodes, and wherein the data is transmitted using a beam forming transmission technique during a second time period of the particular TXOP.

5. The method of claim 3, wherein the schedule indicates that data is transmitted to at least one wireless network node of the plurality of wireless network nodes using a cyclic delay diversity transmission scheme, a multiple input multiple output (MIMO) transmission scheme, a Space Time Block Code (STBC) transmission scheme, or a combination thereof, and wherein the data is transmitted to the at least one wireless network node during a second time period of the particular TXOP.

6. The method of claim 3, wherein the schedule is included in one or more downlink data packets.

7. The method of claim 1, wherein the first schedule information indicates a first time period of first downlink data packet transmissions to the first subset of the plurality of wireless network nodes during the particular TXOP, wherein the second schedule information indicates a second time period of second downlink data packet transmissions to the second subset of the plurality of wireless network nodes during the particular TXOP, and wherein the second time period occurs subsequent to the first time period.

8. The method of claim 1, wherein the schedule includes third schedule information associated with a third subset of the plurality of wireless network nodes and fourth schedule information associated with a particular wireless network node of the plurality of wireless network nodes, wherein the third subset of the plurality of wireless network nodes is configured to communicate using the SDMA scheme, and wherein the particular wireless network node of the plurality of wireless network nodes is configured to communicate using a beam forming scheme.

9. The method of claim 8, further comprising:
   transmitting first downlink data packet transmissions using the SDMA scheme to the first subset of the plurality of wireless network nodes during a first time period of the particular TXOP;
   transmitting second downlink data packet transmissions using the SDMA scheme to the third subset of the plurality of wireless network nodes during a second time period of the particular TXOP, wherein the second time period is subsequent to the first time period;
   transmitting third downlink data packet transmissions using beam forming to the particular wireless network node during a third time period of the particular TXOP, wherein the third time period is subsequent to the second time period; and
   transmitting fourth downlink data packet transmissions using the non-SDMA scheme to the second subset of the plurality of wireless network nodes during a fourth time period of the particular TXOP, wherein the fourth time period is subsequent to the third time period.

10. The method of claim 8, further comprising:
    receiving first uplink data packet transmissions from the first subset of the plurality of wireless network nodes, the third subset of the plurality of wireless network nodes, the particular wireless network node, or a combination thereof, during a first time period of the particular TXOP; and
    receiving second uplink data packet transmissions from the second subset of the plurality of wireless network nodes during a second time period of the particular TXOP, wherein the second time period is subsequent to the first time period.

11. The method of claim 1, further comprising scheduling a transmission time of a particular uplink data packet transmission of a first wireless network node of the first subset of the plurality of wireless network nodes, wherein a second wireless network node of the first subset of the plurality of wireless network nodes is not scheduled based on the second wireless network node exhibiting a high correlation with the first wireless network node.

12. The method of claim 11, further comprising determining that the second wireless network node exhibits the high correlation with the first wireless network node based on one or more signals of the channel state training signals.

13. A method comprising:
sending a message to a plurality of wireless network nodes, the message including a schedule of uplink wireless data transmissions and downlink wireless data transmissions during a particular transmit opportunity (TXOP), wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and
receiving channel state training signals from the plurality of the wireless network nodes based on the message.

14. The method of claim 13, wherein the schedule comprises an allocation of a number of streams to the plurality of wireless network nodes.

15. The method of claim 13, wherein the schedule includes third schedule information that indicates data is transmitted to at least one wireless network node of a third subset of the plurality of wireless network nodes, and wherein the data is transmitted using beam forming.

16. The method of claim 13, wherein the second schedule information indicates that data is transmitted to at least one wireless network node of the second subset of the plurality of wireless network nodes, wherein the data is transmitted using an omni-directional transmission.

17. The method of claim 13, further comprising exchanging data packets with the plurality of wireless network nodes according to the schedule and based on the channel state training signals.

18. The method of claim 17, further comprising controlling an exchange of the data packets to increase a spatial diversity between a first wireless network node of the plurality of wireless network nodes and a second wireless network node of the plurality of wireless network nodes.

19. The method of claim 13, further comprising including the schedule in a header of a particular downlink data packet transmission.

20. A method comprising:
receiving, from a device, a message requesting transmission of one or more channel state signals, wherein the message includes a schedule of uplink wireless data transmissions and downlink wireless data transmissions during a particular transmit opportunity (TXOP), wherein the schedule includes first schedule information associated with a first subset of a plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and
sending, to the device, a channel state training signal after receiving the message.

21. The method of claim 20, wherein the first schedule information indicates that the first subset of the plurality of wireless network nodes communicates concurrently using the SDMA scheme during a first time period of the particular TXOP, and wherein the second schedule information indicates that one or more data packets are transmitted to the device during a second time period of the particular TXOP.

22. The method of claim 20, further comprising determining a proximity of the device based on a comparison of a receive power of the message to a value of a target receive power field in a header of the message, wherein the header includes the schedule.

23. The method of claim 20, further comprising modifying a scheduled uplink transmission time based on a ranging subfield in a header of the message, wherein the header includes the schedule and one or more station information fields, each station information field of the one or more station information fields including a number of spatial streams subfields and the ranging subfield.

24. An apparatus comprising:
first logic circuit configured to receive channel state training signals from a plurality of wireless network nodes;
second logic circuit configured to generate a schedule of uplink data packet transmissions and downlink data packet transmissions during a particular transmit opportunity (TXOP), wherein the schedule is based on the channel state training signals; and
third logic circuit configured to send the schedule to the plurality of wireless network nodes, wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme.

25. The apparatus of claim 24, further comprising:
fourth logic circuit configured to send a request message to the plurality of wireless network nodes, wherein the channel state training signals are received from the plurality of wireless network nodes based on the request message.

26. The apparatus of claim 25, wherein the schedule includes third schedule information that indicates data is transmitted to at least one wireless network node of a third subset of the plurality of wireless network nodes, wherein the data is transmitted using a beam forming transmission technique.

27. The apparatus of claim 24, wherein the channel state training signals include sounding signals.

28. The apparatus of claim 27, wherein the channel state training signals further include channel quality information.

29. The apparatus of claim 24, wherein the second subset of the plurality of wireless network nodes comprises a single wireless network node of the plurality of wireless network nodes.

30. An apparatus comprising:
first logic circuit configured to send a message to a plurality of wireless network nodes, the message containing a schedule of uplink wireless data transmissions and downlink wireless data transmissions during a particular transmit opportunity (TXOP), wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and second logic circuit configured to receive channel state training signals from the plurality of the wireless network nodes responsive to the message.

31. The apparatus of claim 30, wherein the schedule includes third schedule information that indicates data is transmitted to at least one wireless network node of the plurality of wireless network nodes using beam forming.

32. The apparatus of claim 30, wherein the schedule indicates that data is transmitted to at least one wireless network node of the plurality of wireless network nodes using an omni-directional transmission.

33. An apparatus comprising:
first logic circuit configured to receive, from a device, a message requesting transmission of one or more channel state signals, wherein the message includes a schedule of uplink wireless transmissions and downlink wireless transmissions during a particular transmit opportunity (TXOP), wherein the schedule includes first schedule information associated with a first subset of a plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes configured to communicate using a non-SDMA scheme; and
second logic circuit configured to send, to the device, a channel state training signal responsive to the message.

34. The apparatus of claim 33, wherein the schedule comprises an allocation of a number of streams to the plurality of wireless network nodes.

35. An apparatus comprising:
means for receiving channel state training signals from a plurality of wireless network nodes;
means for generating a schedule of uplink data packet transmissions and downlink data packet transmissions during a particular transmit opportunity (TXOP), wherein the schedule is based on the channel state training signals; and
means for sending the schedule to the plurality of wireless network nodes, wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme.

36. An apparatus comprising:
means for sending a message to a plurality of wireless network nodes, the message containing a schedule of uplink wireless transmissions and downlink wireless transmissions during a particular transmit opportunity (TXOP), wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and
means for receiving channel state training signals from the plurality of wireless network nodes based on the message.

37. An apparatus comprising:
means for receiving, from a device, a message requesting transmission of one or more channel state signals, wherein the message includes a schedule of uplink wireless data transmissions and downlink wireless data transmissions during a particular transmit opportunity (TXOP), wherein the schedule includes first schedule information associated with a first subset of a plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and
means for sending, to the device, a channel state training signal responsive to the message.

38. A non-transitory computer-readable medium storing instructions that, when executed by a processor, cause the processor to:
receive channel state training signals from a plurality of wireless network nodes;
generate a schedule of uplink data packet transmissions and downlink data packet transmissions during a particular transmit opportunity (TXOP), wherein the schedule is based on the channel state training signals; and
send the schedule to the plurality of wireless network nodes, wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme.

39. A non-transitory computer-readable medium storing instructions that, when executed by a processor, cause the processor to:
send a message to a plurality of wireless network nodes, the message containing a schedule of uplink wireless data transmissions and downlink wireless data transmissions during a particular transmit opportunity (TXOP), wherein the schedule includes first schedule information associated with a first subset of the plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and receive channel state training signals from the plurality of the wireless network nodes based on the message.

40. A non-transitory computer-readable medium storing instructions that, when executed by a processor, cause the processor to:

receive, from a device, a message requesting transmission of one or more channel state signals, wherein the message includes a schedule of uplink wireless data transmissions and downlink data transmissions during a particular transmit opportunity (TXOP), wherein the schedule includes first schedule information associated with a first subset of a plurality of wireless network nodes and second schedule information associated with a second subset of the plurality of wireless network nodes, wherein the first subset of the plurality of wireless network nodes is configured to communicate concurrently using a spatial division multiple access (SDMA) scheme, and wherein the second subset of the plurality of wireless network nodes is configured to communicate using a non-SDMA scheme; and send, to the device, a channel state training signal responsive to the message.

\* \* \* \* \*